(12) United States Patent
Prasad et al.

(10) Patent No.: US 11,810,086 B2
(45) Date of Patent: Nov. 7, 2023

(54) SYSTEM, METHOD, AND COMPUTER PROGRAM PRODUCT FOR GENERATING DIGITAL RECEIPTS

(71) Applicant: Visa International Service Association, San Francisco, CA (US)

(72) Inventors: Ranjiva Prasad, Hampshire (GB); Thomas Patrick McCoy, London (GB)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/411,566

(22) Filed: Aug. 25, 2021

(65) Prior Publication Data

US 2023/0064227 A1 Mar. 2, 2023

(51) Int. Cl.
*G06Q 20/10* (2012.01)
*G06Q 20/32* (2012.01)
*G06Q 20/04* (2012.01)

(52) U.S. Cl.
CPC ......... *G06Q 20/108* (2013.01); *G06Q 20/047* (2020.05); *G06Q 20/3267* (2020.05)

(58) Field of Classification Search
CPC . G06Q 20/108; G06Q 20/047; G06Q 20/3267
See application file for complete search history.

(56) References Cited

U.S. PATENT DOCUMENTS

| | | |
|---|---|---|
| 5,739,512 A | 4/1998 | Tognazzini |
| 7,797,192 B2 | 9/2010 | Mitchell et al. |
| 8,820,635 B2 | 9/2014 | Rothschild |
| 10,192,210 B2 | 1/2019 | Baig |

(Continued)

FOREIGN PATENT DOCUMENTS

| | | | | |
|---|---|---|---|---|
| AU | 2021101937 A4 | * | 6/2021 | |
| WO | WO-2016110697 A1 | * | 7/2016 | ....... G06F 17/30864 |
| WO | WO-2020013940 A1 | * | 1/2020 | ........... G06Q 20/027 |

OTHER PUBLICATIONS

Lee et al. "A Payment & Receipt Business Model in U-Commerce Environment." ICEC'06, Aug. 14-16, 2006, Fredericton, Canada. pp. 319-324. (Year: 2006).*

(Continued)

*Primary Examiner* — Virpi H Kanervo
(74) *Attorney, Agent, or Firm* — THE WEBB LAW FIRM

(57) ABSTRACT

A method, system, and computer program product is provided for generating digital receipts. The method includes receiving, through a first communication channel, a transaction request message from a merchant system for a transaction between a consumer and the merchant system using an account identifier, assigning a transaction identifier to the transaction, storing the first transaction data in association with the transaction identifier in at least one data storage device, receiving, through a second communication channel, digital receipt data comprising a digital receipt object and second transaction data, processing the transaction using the account identifier, determining the transaction identifier based on the second transaction data by matching the second transaction data to the first transaction data in the at least one data storage device, and storing the digital receipt object in association with the transaction identifier in the at least one data storage device or at least one other storage device.

12 Claims, 5 Drawing Sheets

(56) References Cited

U.S. PATENT DOCUMENTS

| | | | |
|---|---|---|---|
| 10,410,200 B2 | 9/2019 | Tsou et al. | |
| 11,436,574 B1* | 9/2022 | Persaud | G06Q 20/047 |
| 2009/0271322 A1 | 10/2009 | Lay et al. | |
| 2011/0137803 A1 | 6/2011 | Willins | |
| 2012/0203644 A1 | 8/2012 | Phillips | |
| 2012/0203698 A1* | 8/2012 | Duncan | G06Q 20/34 705/44 |
| 2012/0221446 A1* | 8/2012 | Grigg | G06Q 30/04 705/30 |
| 2013/0204727 A1* | 8/2013 | Rothschild | G06Q 30/014 705/21 |
| 2013/0262281 A1 | 10/2013 | Puchek et al. | |
| 2014/0025515 A1* | 1/2014 | Argue | G06Q 20/389 705/21 |
| 2014/0074631 A1* | 3/2014 | Grossman | G06Q 20/405 705/16 |
| 2014/0114857 A1* | 4/2014 | Griggs | G06Q 40/00 705/44 |
| 2020/0160306 A1* | 5/2020 | Gollan | G06Q 20/204 |
| 2020/0219154 A1* | 7/2020 | Maenpaa | G06Q 20/047 |
| 2021/0117450 A1* | 4/2021 | Taylor | G06F 16/2282 |

OTHER PUBLICATIONS

Sorin Gavrila Gavrila and Antonio Lucas Ancillo. Spanish SMEs' digitalization enablers: E-Receipt applications to the offline retail market. Technological Forecasting & Social Science 162 (2021). (Year: 2021).*

Grbovic et al. E-commerce in Your Inbox: Product Recommendations at Scale. KDD '15 Proceedings of the 21st ACM SIGKDD International Conference on Knowledge Discovery and Data Mining, Aug. 2015, pp. 1809-1818. (Year: 2015).*

"Resolve disputes quickly: Learn the basics about how to handle chargebacks.", VISA, 2020, retrieved from https://www.visa.co.in/support/small-business/dispute-resolution.html, 4 pages.

* cited by examiner

SYSTEM, METHOD, AND COMPUTER PROGRAM PRODUCT FOR GENERATING DIGITAL RECEIPTS

BACKGROUND

1. Field

This disclosure relates generally to digital receipts and, in non-limiting embodiments, systems, methods, and computer program products for generating digital receipts.

2. Technical Considerations

In existing payment processing networks, disputes and chargebacks concerning a transaction are resource-intensive for all of the systems involved due to the lack of available information and communication among the parties. Moreover, existing infrastructures for communicating with the parties to a transaction, including the issuer institution, merchant system, and account holder, are limited with respect to issuing receipts that show a record of the transaction. Users that do not wish to share their personal information (e.g., email address, phone number, account identifier, etc.) with a merchant are particularly limited.

SUMMARY

According to non-limiting embodiments or aspects, provided is a computer-implemented method comprising: receiving, through a first communication channel, a transaction request message from a merchant system for a transaction between a consumer and the merchant system using an account identifier, the transaction request message comprising first transaction data associated with the transaction; assigning, with at least one processor, a transaction identifier to the transaction; storing the first transaction data in association with the transaction identifier in at least one data storage device; receiving, through a second communication channel independent of the first communication channel, digital receipt data comprising a digital receipt object and second transaction data associated with the transaction, the second transaction data comprising at least a subset of transaction parameters of the first transaction data; processing, with at least one processor, the transaction using the account identifier; determining, with at least one processor, the transaction identifier based on the second transaction data by matching the second transaction data to the first transaction data in the at least one data storage device; storing the digital receipt object in association with the transaction identifier in the at least one data storage device or at least one other storage device; receiving a query from at least one external system comprising the transaction identifier; and in response to the query, communicating the digital receipt object to the at least one external system.

In non-limiting embodiments or aspects, the first transaction data and the second transaction data each comprise a checkout identifier generated by the merchant system, wherein matching the second transaction data to the first transaction data in the at least one data storage device comprises matching the checkout identifier from the first transaction data with the checkout identifier from the second transaction data. In non-limiting embodiments or aspects, the digital receipt object comprises an electronic image file. In non-limiting embodiments or aspects, the digital receipt object comprises a structured data file. In non-limiting embodiments or aspects, the method further comprises automatically communicating the digital receipt object and the transaction identifier to an issuer system, the at least one external system comprises the issuer system or at least one other system. In non-limiting embodiments or aspects, the first communication channel comprises an electronic payment processing system, and the second communication channel comprises an Internet-based communication channel. In non-limiting embodiments or aspects, the at least one external system comprises an issuer banking application displayed on a user computing device.

According to non-limiting embodiments or aspects, provided is a system comprising: at least one data storage device comprising transaction data stored in association with transaction identifiers; and at least one processor in communication with the data storage device, the at least one processor programmed or configured to: receive, through a first communication channel, a transaction request message from a merchant system for a transaction between a consumer and the merchant system using an account identifier, the transaction request message comprising first transaction data associated with the transaction; assign a transaction identifier to the transaction; store the first transaction data in association with the transaction identifier in at least one data storage device; receive, through a second communication channel independent of the first communication channel, digital receipt data comprising a digital receipt object and second transaction data associated with the transaction, the second transaction data comprising at least a subset of transaction parameters of the first transaction data; process the transaction using the account identifier; determine the transaction identifier based on the second transaction data by matching the second transaction data to the first transaction data in the at least one data storage device; store the digital receipt object in association with the transaction identifier in the at least one data storage device or at least one other storage device; receive a query from at least one external system comprising the transaction identifier; and in response to the query, communicate the digital receipt object to the at least one external system.

In non-limiting embodiments or aspects, the first transaction data and the second transaction data each comprise a checkout identifier generated by the merchant system, wherein matching the second transaction data to the first transaction data in the at least one data storage device comprises matching the checkout identifier from the first transaction data with the checkout identifier from the second transaction data. In non-limiting embodiments or aspects, the digital receipt object comprises an electronic image file. In non-limiting embodiments or aspects, the digital receipt object comprises a structured data file. In non-limiting embodiments or aspects, the at least one processor is further programmed or configured to automatically communicate the digital receipt object and the transaction identifiers to an issuer system, the at least one external system comprises the issuer system or at least one other system. In non-limiting embodiments or aspects, the first communication channel comprises an electronic payment processing system, and the second communication channel comprises an Internet-based communication channel. In non-limiting embodiments or aspects, the at least one external system comprises an issuer banking application displayed on a user computing device.

According to non-limiting embodiments or aspects, provided is a computer program product comprising at least one non-transitory computer-readable medium including program instructions that, when executed by at least one processor, cause the at least one processor to: receive, through a first communication channel, a transaction request message from a merchant system for a transaction between a consumer and the merchant system using an account identifier, the transaction request message comprising first transaction data associated with the transaction; assign a transaction identifier to the transaction; store the first transaction data in association with the transaction identifier in at least one data storage device; receive, through a second communication channel independent of the first communication channel, digital receipt data comprising a digital receipt object and second transaction data associated with the transaction, the second transaction data comprising at least a subset of transaction parameters of the first transaction data; process the transaction using the account identifier; determine the transaction identifier based on the second transaction data by matching the second transaction data to the first transaction data in the at least one data storage device; store the digital receipt object in association with the transaction identifier in the at least one data storage device or at least one other storage device; receive a query from at least one external system comprising the transaction identifier; and in response to the query, communicate the digital receipt object to the at least one external system.

Other non-limiting embodiments or aspects will be set forth in the following numbered clauses:

Clause 1: A computer-implemented method comprising: receiving, through a first communication channel, a transaction request message from a merchant system for a transaction between a consumer and the merchant system using an account identifier, the transaction request message comprising first transaction data associated with the transaction; assigning, with at least one processor, a transaction identifier to the transaction; storing the first transaction data in association with the transaction identifier in at least one data storage device; receiving, through a second communication channel independent of the first communication channel, digital receipt data comprising a digital receipt object and second transaction data associated with the transaction, the second transaction data comprising at least a subset of transaction parameters of the first transaction data; processing, with at least one processor, the transaction using the account identifier; determining, with at least one processor, the transaction identifier based on the second transaction data by matching the second transaction data to the first transaction data in the at least one data storage device; storing the digital receipt object in association with the transaction identifier in the at least one data storage device or at least one other storage device; receiving a query from at least one external system comprising the transaction identifier; and in response to the query, communicating the digital receipt object to the at least one external system.

Clause 2: The computer-implemented method of clause 1, wherein the first transaction data and the second transaction data each comprise a checkout identifier generated by the merchant system, and wherein matching the second transaction data to the first transaction data in the at least one data storage device comprises matching the checkout identifier from the first transaction data with the checkout identifier from the second transaction data.

Clause 3: The computer-implemented method of clauses 1 or 2, wherein the digital receipt object comprises an electronic image file.

Clause 4: The computer-implemented method of any of clauses 1-3, wherein the digital receipt object comprises a structured data file.

Clause 5: The computer-implemented method of any of clauses 1-4, further comprising automatically communicating the digital receipt object and the transaction identifier to an issuer system, wherein the at least one external system comprises the issuer system or at least one other system.

Clause 6: The computer-implemented method of any of clauses 1-5, wherein the first communication channel comprises an electronic payment processing system, and wherein the second communication channel comprises an Internet-based communication channel.

Clause 7: The computer-implemented method of any of clauses 1-6, wherein the at least one external system comprises an issuer banking application displayed on a user computing device.

Clause 8: A system comprising: at least one data storage device comprising transaction data stored in association with transaction identifiers; and at least one processor in communication with the data storage device, the at least one processor programmed or configured to: receive, through a first communication channel, a transaction request message from a merchant system for a transaction between a consumer and the merchant system using an account identifier, the transaction request message comprising first transaction data associated with the transaction; assign a transaction identifier to the transaction; store the first transaction data in association with the transaction identifier in at least one data storage device; receive, through a second communication channel independent of the first communication channel, digital receipt data comprising a digital receipt object and second transaction data associated with the transaction, the second transaction data comprising at least a subset of transaction parameters of the first transaction data; process the transaction using the account identifier; determine the transaction identifier based on the second transaction data by matching the second transaction data to the first transaction data in the at least one data storage device; store the digital receipt object in association with the transaction identifier in the at least one data storage device or at least one other storage device; receive a query from at least one external system comprising the transaction identifier; and in response to the query, communicate the digital receipt object to the at least one external system.

Clause 9: The system of clause 8, wherein the first transaction data and the second transaction data each comprise a checkout identifier generated by the merchant system, and wherein matching the second transaction data to the first transaction data in the at least one data storage device comprises matching the checkout identifier from the first transaction data with the checkout identifier from the second transaction data.

Clause 10: The system of clauses 8 or 9, wherein the digital receipt object comprises an electronic image file.

Clause 11: The system of any of clauses 8-10, wherein the digital receipt object comprises a structured data file.

Clause 12: The system of any of clauses 8-11, wherein the at least one processor is further programmed or configured to automatically communicate the digital receipt object and the transaction identifiers to an issuer system, wherein the at least one external system comprises the issuer system or at least one other system.

Clause 13: The system of any of clauses 8-12, wherein the first communication channel comprises an electronic payment processing system, and wherein the second communication channel comprises an Internet-based communication channel.

Clause 14: The system of any of clauses 8-13, wherein the at least one external system comprises an issuer banking application displayed on a user computing device.

Clause 15: A computer program product comprising at least one non-transitory computer-readable medium including program instructions that, when executed by at least one processor, cause the at least one processor to: receive, through a first communication channel, a transaction request message from a merchant system for a transaction between a consumer and the merchant system using an account identifier, the transaction request message comprising first transaction data associated with the transaction; assign a transaction identifier to the transaction; store the first transaction data in association with the transaction identifier in at least one data storage device; receive, through a second communication channel independent of the first communication channel, digital receipt data comprising a digital receipt object and second transaction data associated with the transaction, the second transaction data comprising at least a subset of transaction parameters of the first transaction data; process the transaction using the account identifier; determine the transaction identifier based on the second transaction data by matching the second transaction data to the first transaction data in the at least one data storage device; store the digital receipt object in association with the transaction identifier in the at least one data storage device or at least one other storage device; receive a query from at least one external system comprising the transaction identifier; and in response to the query, communicate the digital receipt object to the at least one external system.

Clause 16: The computer program product of clause 15, wherein the first transaction data and the second transaction data each comprise a checkout identifier generated by the merchant system, and wherein matching the second transaction data to the first transaction data in the at least one data storage device comprises matching the checkout identifier from the first transaction data with the checkout identifier from the second transaction data.

Clause 17: The computer program product of clauses 15 or 16, wherein the digital receipt object comprises an electronic image file.

Clause 18: The computer program product of any of clauses 15-17, wherein the digital receipt object comprises a structured data file.

Clause 19: The computer program product of any of clauses 15-18, wherein the at least one processor is further caused to automatically communicate the digital receipt object and the transaction identifiers to an issuer system, wherein the at least one external system comprises the issuer system or at least one other system.

Clause 20: The computer program product of any of clauses 15-19, wherein the first communication channel comprises an electronic payment processing system, and wherein the second communication channel comprises an Internet-based communication channel.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying schematic figures, in which.

DESCRIPTION

Figure 1:
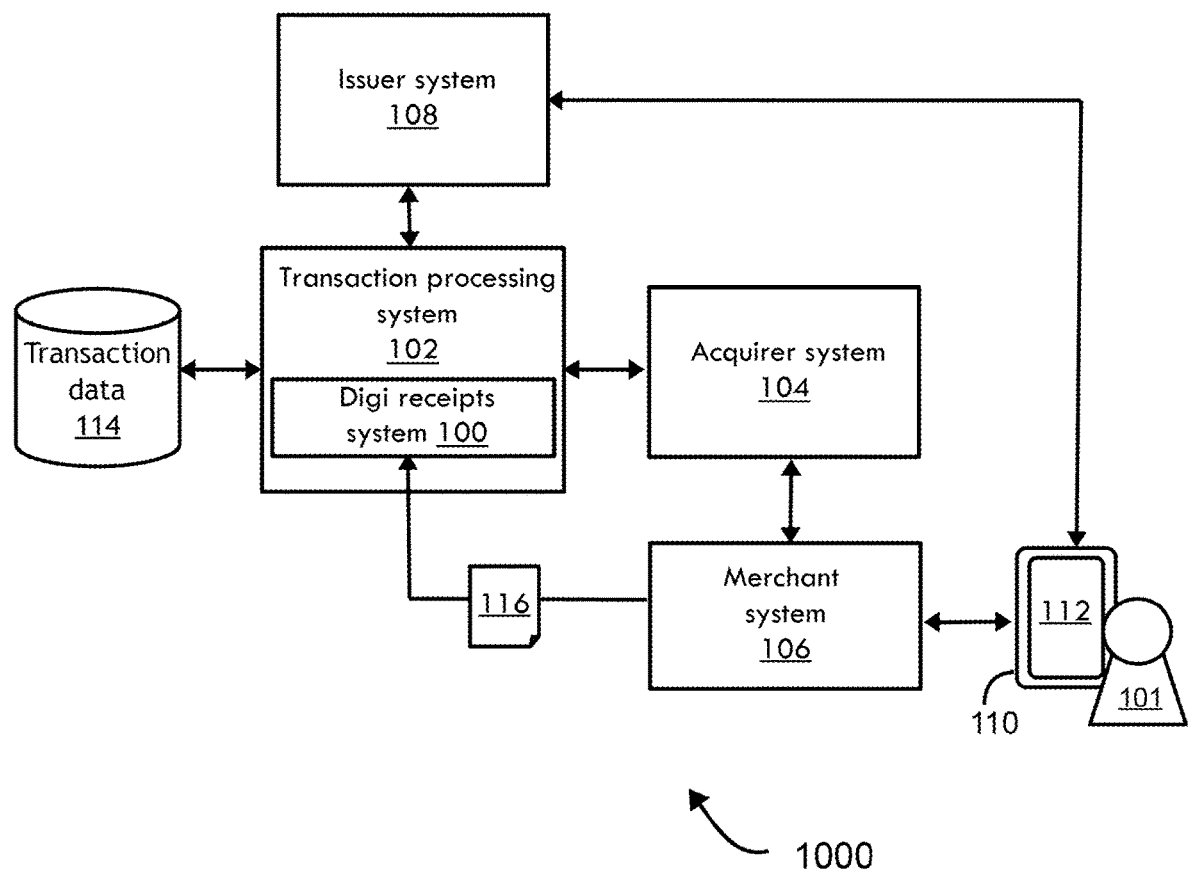
FIG. 1 is a schematic diagram of a system for generating digital receipts according to non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments, an acquirer institution may be a financial institution, such as a bank. As used herein, the term "acquirer system" may refer to one or more computing devices operated by or on behalf of an acquirer institution, such as a server computer executing one or more software applications.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a PAN, to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer devices operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computing device, an access card, a wireless terminal, a transponder, and/or the like. In some non-limiting embodiments, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

In non-limiting embodiments, digital receipts are generated for customer purchases and provided to entities via a query to alleviate the burden, including unnecessary network communications and use of computing resources, of investigating a particular transaction. By utilizing two separate communication channels for the transaction request from the merchant and the digital receipt from the merchant, existing electronic payment processing network architecture may still be used by the merchant. Moreover, a customer requesting more information about or disputing a transaction with an issuer often has to make several separate inquiries and, even then, may not be able to find line-item information for a disputed transaction. Thus, customers that want to dispute a transaction would have to carefully organize their own receipts and use bandwidth to upload that receipt to an issuer. The issuer, in turn, would then have to expend computational resources and other resources to send the same information to the merchant, to a transaction service provider, and/or the like, to resolve a dispute. Non-limiting embodiments reduce the number of communications and the amount of computation resources expended in disputing a transaction or taking any other action that uses information from a receipt relating to a transaction between a consumer and a merchant system.

FIG. 1 depicts a system 1000 for generating digital receipts according to a non-limiting embodiment. The system 1000 includes a transaction processing system 102 including a digital receipts system 100. The digital receipts system 100 is shown as part of the transaction processing system 102 but it will be appreciated that the digital receipts system 100 may be separate and/or external to the transaction processing system 102 in non-limiting embodiments. The digital receipts system 100 includes a computing device and/or one or more software applications executed by a computing device for storing and providing digital receipts. The transaction processing system 102 and/or digital receipts system 100 are also in communication with an acquirer system 104, a merchant system 106, and an issuer system 108. The digital receipts system 100 is in communication with a transaction database 114, which may include one or more data storage devices having transaction data stored thereon.

With continued reference to FIG. 1, in operation, a user 101 may initiate a transaction with a merchant system 106, such as a merchant website or POS system. The user 101 may use a payment device such as but not limited to client computing device 110 displaying user interface 112. After receiving payment device information from the user 101, the merchant system 106 may generate a transaction request message and communicate it to the acquirer system 104. Additionally or alternatively, the merchant system 106 may communicate a transaction request message to a payment gateway (not shown in FIG. 1) separate from the acquirer system 104 and/or directly to the transaction processing system 102. The acquirer system 104 (or payment gateway) may then forward the transaction request message to the transaction processing system 102 for processing. The transaction processing system 102 may process the transaction request message by generating an authorization request message and communicating the authorization request message to the issuer system 108.

Still referring to FIG. 1, the merchant system 106 may also generate a digital receipt object and communicate it to the client computing device 110 and the digital receipts system 100. The client computing device 110 may display the digital receipt object on an user interface 112. As used herein, the term "digital receipt object" refers to structured or unstructured data representing a transaction between a user 101 and a merchant system 106 such as an image of a receipt (e.g., a photograph or a digitally-rendered receipt) and/or a structured data file (e.g., HTML, JavaScript Object Notation (JSON), Extensible Markup Language (XML), and/or the like). In some non-limiting examples, a digital receipt may include an email receipt including text, images, and/or markup/layout data, such as an email receipt that is sent to a customer after a purchase. In non-limiting embodiments, the digital receipt object is an image without textual information (e.g., without Optical Character Recognition (OCR)). In other non-limiting embodiments, the digital receipt object is machine-readable. It will be appreciated that other forms of data may be used to construct a digital receipt object.

With continued reference to FIG. 1, the merchant system 106 may communicate the digital receipt to the digital receipts system 100 via a second communication channel different than the first communication channel used to communicate the transaction request message (e.g., via the electronic payment processing network). The second communication channel may be a communication channel external or internal to the electronic payment processing network in some examples. For example, the merchant system 106 may send the digital receipt object to the digital receipts system 100 via an Internet-based communication channel, such as email, one or more Internet communication protocols (e.g., HTTP), one or more Application Programming Interfaces (APIs), one or more links identifying a network location of the digital receipt object, and/or the like.

Still referring to FIG. 1, once received by the digital receipts system 100, the digital receipt object is stored in the transaction database 114. In non-limiting embodiments, transaction data in addition to a digital receipt object 116 is communicated by the merchant system 106 with or associated with the digital receipt object 116 such that the digital receipts system 100 can match the transaction data received from the merchant system 106 with transaction data in the transaction database 114. For example, the merchant system 106 may generate a checkout identifier (e.g., basket identifier) that is unique to the transaction and include this identifier in the transaction data sent to the acquirer system 104 (or payment gateway) (e.g., such as inside the transaction request message) as well as communicating the identifier with the digital receipt object 116 to the digital receipts system 100. The checkout identifier may be randomly generated and/or may be generated using transaction data as an input.

Figure 2:
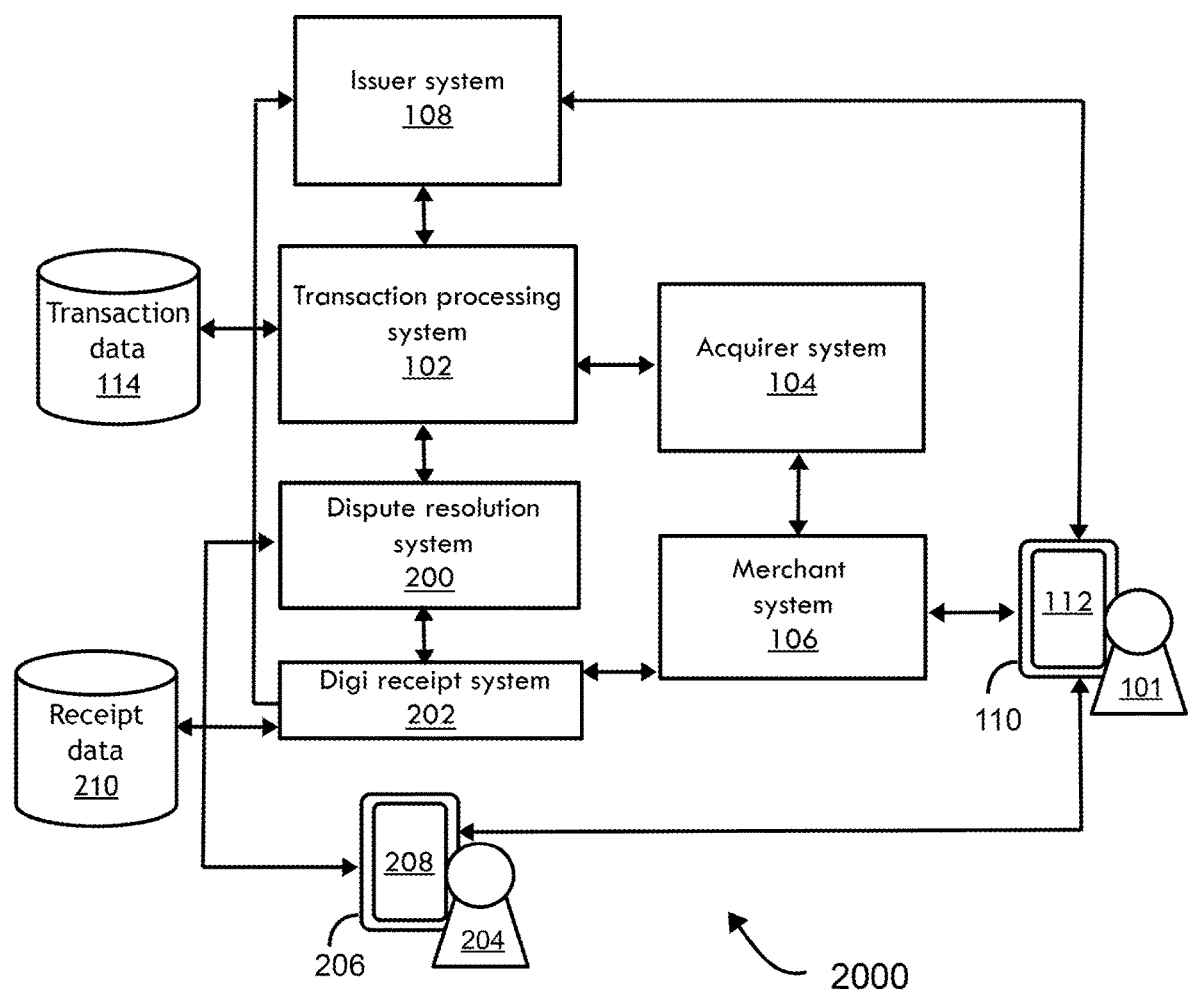
FIG. 2 is a schematic diagram of a system for generating digital receipts according to non-limiting embodiments or aspects.

FIG. 2 depicts a system 2000 for generating digital receipts according to a non-limiting embodiment. In FIG. 2, a digital receipts system 202 is shown external to the transaction processing system 102. The digital receipts system 202 may operate like the digital receipts system 100 in FIG. 1. Also shown in FIG. 2 is a dispute resolution system 200, which may include hardware and/or software (e.g., such as a computing device executing one or more software applications) for handling transaction disputes. The dispute resolution system 200 is also shown external to the transaction processing system 102 in FIG. 2. However, it will be appreciated that the digital receipts system 202 and/or the dispute resolution system may be part of and/or controlled by the transaction processing system 102 in non-limiting embodiments.

With continued reference to FIG. 2, also shown is an additional entity 204 (e.g., such as a customer service agent for the issuer institution associated with issuer system 108) operating an additional computing device 206. In some non-limiting embodiments, the computing device 206 may be part of the issuer system 108. For example, the computing device 206 may a customer service system operated by an issuer institution and the issuer system 108 may be an e-wallet system operated by that same issuer institution. Various other arrangements are possible. In the depicted example, the computing device 206 accesses the dispute resolution system 200 and displays a user interface 208 that permits the customer service agent 204 to query the dispute resolution system 200 for a particular transaction. The dispute resolution system 200 may expose one or more APIs to permit such querying by the customer service agent 204 (via the computing device 206) and/the or user 101 (via the client computing device 110). The dispute resolution system 200 may be queried with transaction data, a checkout identifier, and/or a digital receipt object to identify corresponding data in the transaction database 114 or any other data storage device.

Still referring to FIG. 2, the digital receipts system 202 may be in communication with a receipts database 210, which may include one or more data storage devices having digital receipt data (e.g., digital receipt objects from various transactions) stored thereon. It will be appreciated that digital receipt data may additionally or alternatively be stored in one or more transaction databases 114 or elsewhere. In operation, the merchant system 106 may communicate a digital receipt object and a checkout identifier to the digital receipts system 202 before, after, or concurrently with communicating a transaction request message to the acquirer system 104 (or payment gateway). In this manner, a customer service agent 204 may view the digital receipt object for a disputed transaction through user interface 208. This viewing may occur while the customer service agent 204 is interacting (e.g., talking, chatting, etc.) with the user 101.

Figure 3:
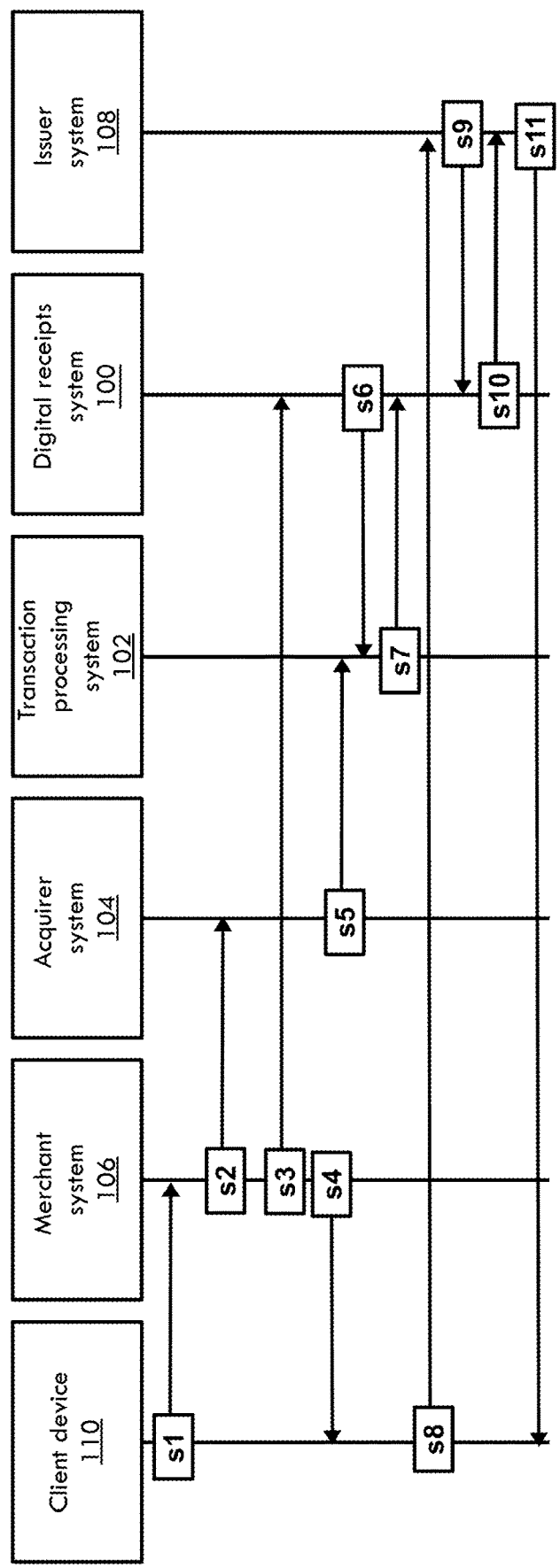
FIG. 3 is a sequence diagram for generating digital receipts according to non-limiting embodiments or aspects.

Referring now to FIG. 3, a sequence diagram for generating digital receipts is shown according to a non-limiting embodiment. It will be appreciated that additional, fewer, and/or a different order of steps may be used in non-limiting embodiments, and that the steps shown in FIG. 3 are for example purposes. At step s1, a customer uses a client computing device 110 to initiate a payment transaction with a merchant system 106. This may include an in-person transaction at a POS device or a remote transaction through a website or mobile application. In response to the transaction request, the merchant system 106 at step s2 communicates a transaction request message to the acquirer system 104 (or payment gateway) via a first communication channel, such as an electronic payment processing network. The transaction request message may include, in addition to transaction data relating to the details transaction, a checkout identifier that uniquely identifies the transaction among of a plurality of transactions. The checkout identifier may be generated by the merchant system 106 or by any other system and provided to the merchant system 106.

At steps s3 and s4, the merchant system 106 communicates a digital receipt object to the digital receipts system 100 and the client computing device 110, respectively. The communication of the digital receipt object to the digital receipts system 100 may be via a second communication channel different than the first communication channel used in step s2 to communicate a transaction request message, such as email, one or more Internet communication protocols (e.g., HTTP), one or more APIs, one or more links identifying a network location of the digital receipt object, and/or the like. The communication of the digital receipt to the client device may also be via the second communication or may be a third communication channel different than both the first and second communication channels.

In response to receiving the transaction request message at step s2, the acquirer system 104 then communicates the transaction request message to the transaction processing system 102 at step s5. The transaction processing system 102 then completes a transaction flow (not shown in FIG. 3) involving communicating an authorization request message to the issuer system 108, receiving an authorization response message back from the issuer system 108, communicating the result to the merchant system 106, and settling the payment transaction.

With continued reference to FIG. 3, at step s6 the digital receipts system 100 may request (e.g., via a query) a transaction identifier relating to one or more digital receipt objects and/or other data received from the merchant system at step s3. This request may include sending the checkout identifier and/or any other transaction data provided by the merchant system at step s2, as an example. At step s7, the transaction processing system 102 responds by communicating the transaction identifier associated with the checkout identifier to the digital receipts system 100. The digital receipts system 100 may then store the transaction identifier in association with the checkout identifier and the corresponding digital receipt object in a digital receipt database. It will be appreciated that, additionally or alternatively to sending the transaction identifier at step s7, the transaction processing system 102 may provide any transaction data that enables identification of the transaction.

Still referring to FIG. 3, at some point the customer operating the client computing device 110 may wish to inquire about a transaction, view additional information relating to a transaction, and/or dispute a transaction. At step s8 the client computing device 110 may communicate a request for more information relating to a transaction in response to, for example, the customer selecting a transaction from a transaction history on a mobile application or website presented on the client computing device 110 (such as an issuer mobile application). The client computing device 110 may also communicate a request for more information through a customer service system, such as a chat with a customer service representative or the like. At step s9, the issuer system 108 requests the digital receipt object by communicating the transaction identifier to the digital receipts system 100. At step s10, the digital receipts system 100 responds by communicating digital receipt information, such as the digital receipt object, to the issuer system 108. At step s11, the issuer system 108 may communicate the digital receipt object or information derived from the digital receipt object to the client computing device 110.

Although FIG. 3 does not display a dispute resolution system (e.g., such as dispute resolution system 200 shown in FIG. 2), it will be appreciated that such a system may be included in the sequence of messages. The dispute resolution system may be part of the transaction processing system. In other examples, the dispute resolution system may include the digital receipts system 100.

Figure 4:
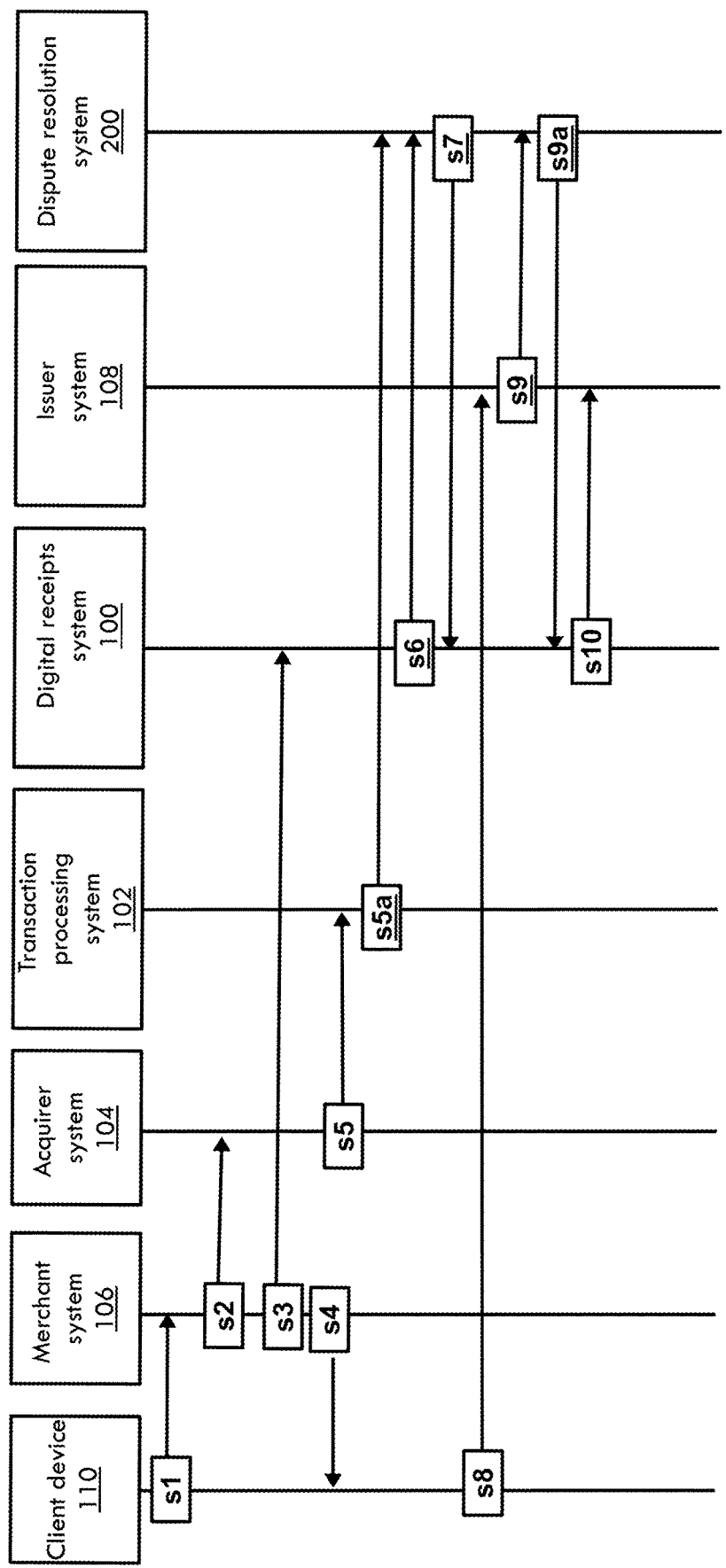
FIG. 4 is a sequence diagram for generating digital receipts according to non-limiting embodiments or aspects.

FIG. 4 shows a sequence diagram for generating digital receipts according to a non-limiting embodiment that includes a dispute resolution system 200. Steps s1 through s5 may proceed as described above in connection with FIG. 3. At step s5a, the transaction processing system 102 may communicate transaction data relating to an authorized and/or processed payment transaction to the dispute resolution system 200. At step s6, the digital receipts system 100 may request (e.g., via a query) a transaction identifier from the dispute resolution system 200 relating to one or more digital receipt objects and/or other data received from the merchant system at step s3. At step s7, the dispute resolution system 200 responds by communicating the transaction identifier associated with the checkout identifier to the digital receipts system 100, based on the transaction data previously received at step s5a. The digital receipts system 100 may then store the transaction identifier in association with the checkout identifier and the corresponding digital receipt object in a digital receipt database. It will be appreciated that, additionally or alternatively to sending the transaction identifier at step s7, the dispute resolution system may provide any transaction data that enables identification of the transaction. Step s8 may proceed as described above in connection with FIG. 3. At step s9, the issuer system 108 requests the digital receipt object and/or initiates a dispute for a transaction by communicating the transaction identifier to the dispute resolution system 200. At step s9a the dispute resolution system 200 queries the digital receipts information 100 to obtain the digital receipt object. At step s10, the digital receipts system 100 responds by communicating digital receipt information, such as the digital receipt object, to the issuer system 108 for initiating the dispute.

Figure 5:
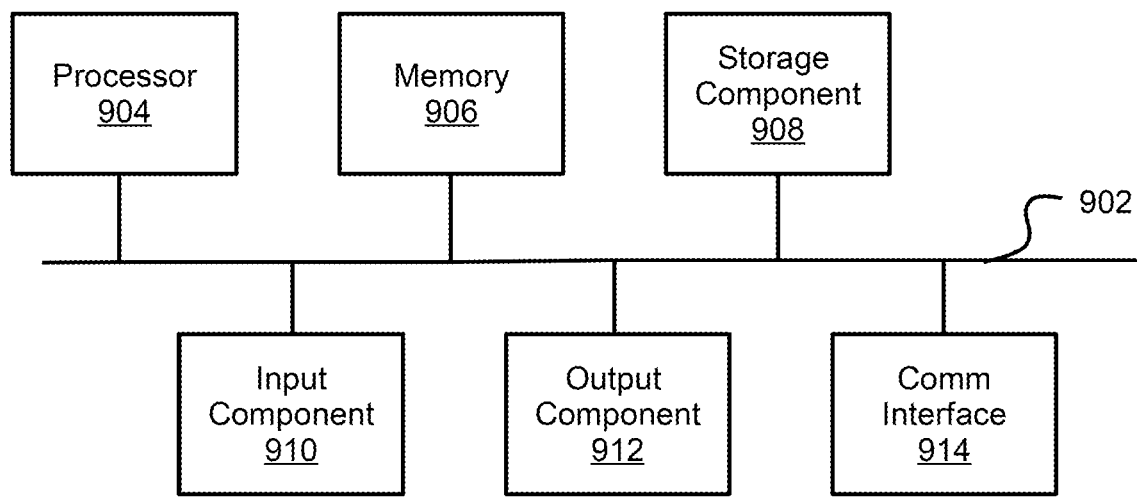
FIG. 5 illustrates example components of a device used in connection with non-limiting embodiments or aspects.

Referring now to FIG. 5, shown is a diagram of example components of a device 900 according to non-limiting embodiments. Device 900 may correspond to the client computing device 110, transaction processing system 102, digital receipts system 100, acquirer system 104, merchant system 106, and/or issuer system 108 in FIG. 1, as an example. In some non-limiting embodiments, such systems or devices may include at least one device 900 and/or at least one component of device 900. The number and arrangement of components shown are provided as an example. In some non-limiting embodiments, device 900 may include additional components, fewer components, different components, or differently arranged components than those shown in FIG. 1. Additionally, or alternatively, a set of components (e.g., one or more components) of device 900 may perform one or more functions described as being performed by another set of components of device 900.

As shown in FIG. 5, device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 5, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A computer-implemented method comprising:
    receiving, by a transaction processing system comprising at least one processor, through a first communication channel, a transaction request message from a merchant system for a transaction between a consumer and the merchant system using an account identifier, the transaction request message comprising first transaction data associated with the transaction, the first communication channel comprising a payment processing network, the first transaction data comprising a checkout identifier generated by the merchant system, the first transaction data not including personal information of the consumer, wherein the transaction processing system is independent from the merchant system and an issuer system;
    assigning, by the at least one processor, a transaction identifier to the transaction;
    storing, by the at least one processor, the first transaction data in association with the transaction identifier in at least one data storage device;
    receiving, by the at least one processor, through a second communication channel independent of and different than the first communication channel, digital receipt data from the merchant system comprising a digital receipt object and second transaction data associated with the transaction, the second transaction data comprising at least a subset of transaction parameters of the first transaction data, the second transaction data comprising the checkout identifier generated by the merchant system;
    processing, by the at least one processor, the transaction using the account identifier;
    determining, by the at least one processor, the transaction identifier based on the second transaction data by matching the second transaction data to the first transaction data in the at least one data storage device, wherein matching the second transaction data to the first transaction data in the at least one data storage device comprises matching the checkout identifier;
    storing, by the at least one processor, the digital receipt object in association with the transaction identifier in the at least one data storage device or at least one other storage device;
    receiving, by the at least one processor, a query from at least one external system comprising the transaction identifier, wherein the at least one external system comprises the issuer system; and
    in response to the query, automatically communicating, by the at least one processor, the digital receipt object and the transaction identifier to the issuer system.

2. The computer-implemented method of claim 1, wherein the digital receipt object comprises an electronic image file.

3. The computer-implemented method of claim 1, wherein the digital receipt object comprises a structured data file.

4. The computer-implemented method of claim 1, wherein the first communication channel comprises an electronic payment processing system, and wherein the second communication channel comprises an internet-based communication channel.

5. A system comprising:
    at least one data storage device comprising transaction data stored in association with transaction identifiers; and
    a transaction processing system comprising at least one processor in communication with the data storage device, the at least one processor programmed or configured to:
        receive, through a first communication channel, a transaction request message from a merchant system for a transaction between a consumer and the merchant system using an account identifier, the transaction request message comprising first transaction data associated with the transaction, the first communication channel comprising a payment processing network, the first transaction data comprising a checkout identifier generated by the merchant system, the first transaction data not including personal information of the consumer, wherein the transaction processing system is independent from the merchant system and an issuer system;
        assign a transaction identifier to the transaction;
        store the first transaction data in association with the transaction identifier in at least one data storage device;
        receive, through a second communication channel independent of and different than the first communication channel, digital receipt data from the merchant system comprising a digital receipt object and second transaction data associated with the transaction, the second transaction data comprising at least a subset of transaction parameters of the first transaction data, the second transaction data comprising the checkout identifier generated by the merchant system;
        process the transaction using the account identifier;
        determine the transaction identifier based on the second transaction data by matching the second transaction data to the first transaction data in the at least one data storage device, wherein matching the second transaction data to the first transaction data in the at least one data storage device comprises matching the checkout identifier;
        store the digital receipt object in association with the transaction identifier in the at least one data storage device or at least one other storage device;
        receive a query from at least one external system comprising the transaction identifier, wherein the at least one external system comprises the issuer system; and
        in response to the query, automatically communicate the digital receipt object and the transaction identifier to the issuer system.

6. The system of claim 5, wherein the digital receipt object comprises an electronic image file.

7. The system of claim 5, wherein the digital receipt object comprises a structured data file.

8. The system of claim 5, wherein the first communication channel comprises an electronic payment processing system, and wherein the second communication channel comprises an internet-based communication channel.

9. A computer program product comprising at least one non-transitory computer-readable medium including program instructions that, when executed by at least one processor of a transaction processing system, cause the at least one processor to:
 receive, through a first communication channel, a transaction request message from a merchant system for a transaction between a consumer and the merchant system using an account identifier, the transaction request message comprising first transaction data associated with the transaction, the first communication channel comprising a payment processing network, the first transaction data comprising a checkout identifier generated by the merchant system, the first transaction data not including personal information of the consumer, wherein the transaction processing system is independent from the merchant system and an issuer system;
 assign a transaction identifier to the transaction;
 store the first transaction data in association with the transaction identifier in at least one data storage device;
 receive, through a second communication channel independent of and different than the first communication channel, digital receipt data from the merchant system comprising a digital receipt object and second transaction data associated with the transaction, the second transaction data comprising at least a subset of transaction parameters of the first transaction data, the second transaction data comprising the checkout identifier generated by the merchant system;
 process the transaction using the account identifier;
 determine the transaction identifier based on the second transaction data by matching the second transaction data to the first transaction data in the at least one data storage device, wherein matching the second transaction data to the first transaction data in the at least one data storage device comprises matching the checkout identifier;
 store the digital receipt object in association with the transaction identifier in the at least one data storage device or at least one other storage device;
 receive a query from at least one external system comprising the transaction identifier, wherein the at least one external system comprises the issuer system; and
 in response to the query, automatically communicate the digital receipt object and the transaction identifier to the issuer system.

10. The computer program product of claim 9, wherein the digital receipt object comprises an electronic image file.

11. The computer program product of claim 9, wherein the digital receipt object comprises a structured data file.

12. The computer program product of claim 9, wherein the first communication channel comprises an electronic payment processing system, and wherein the second communication channel comprises an internet-based communication channel.

\* \* \* \* \*